Dec. 2, 1930. A. H. REED 1,783,452
PARACHUTE CORD RETAINER
Filed Feb. 23, 1928 2 Sheets-Sheet 1
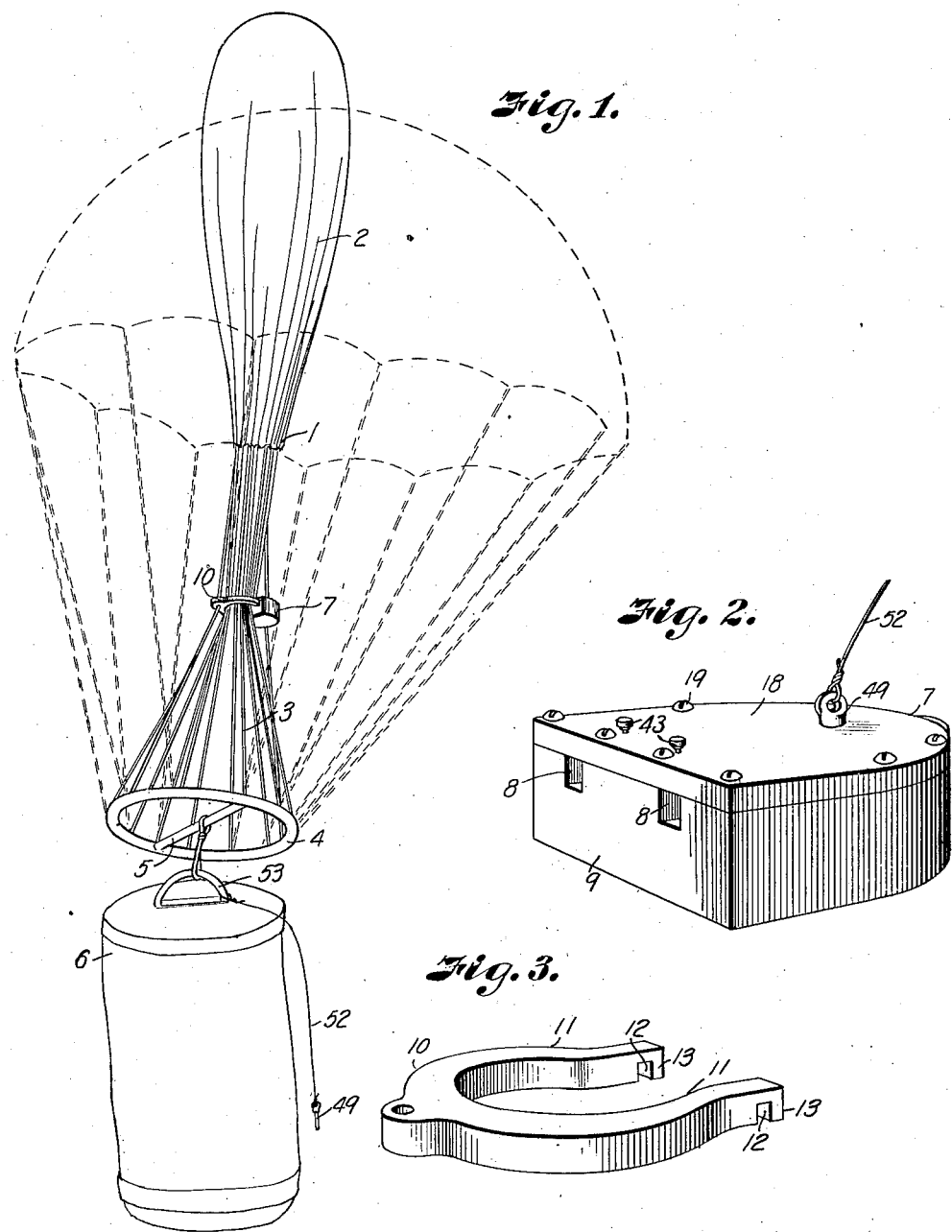
INVENTOR.
Andrew H. Reed
BY
ATTORNEY Dec. 2, 1930.    A. H. REED    1,783,452
PARACHUTE CORD RETAINER
Filed Feb. 23, 1928    2 Sheets-Sheet 2
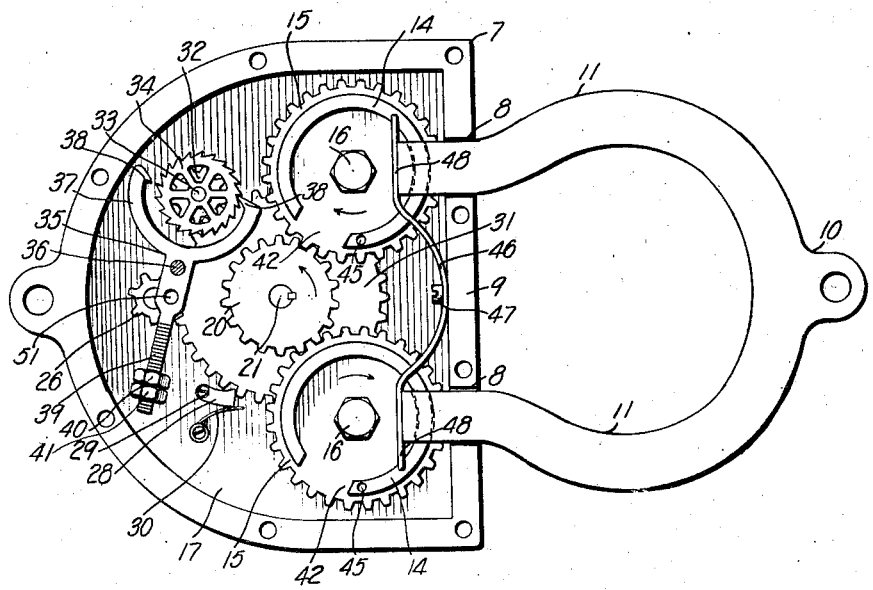

Patented Dec. 2, 1930

1,783,452

UNITED STATES PATENT OFFICE

ANDREW H. REED, OF KANSAS CITY, MISSOURI, ASSIGNOR OF ONE-THIRD TO CHARLES W. TURNER AND ONE-THIRD TO S. M. COFFMAN, BOTH OF KANSAS CITY, MISSOURI

PARACHUTE-CORD RETAINER

Application filed February 23, 1928. Serial No. 256,269.

My invention relates to parachutes and more particularly to devices for delaying the opening of a falling parachute, the principal objects of the invention being to releasably bind the cords of the parachute in closely assembled relation to prevent opening for a predetermined period during its drop, to support the device by the parachute cords, and to retain the members of the device in engagement with the parachute ring after the device has released the cords.

In accomplishing these and other objects of the invention I have provided improved details of structure, the preferred forms of which are illustrated in the accompanying drawings, wherein:

Fig. 1 is a perspective view of a parachute, a parcel supported thereby, and my device shown retaining the parachute in closed position, dotted lines indicating the open form of the parachute.

Fig. 2 is a perspective view of a case member of the device.

Fig. 3 is a perspective view of a loop member.

Fig. 4 is a plan view of assembled loop member and uncovered case member in functioning relation.

Fig. 5 is a vertical central section of the assembled device through the two members.

Fig. 6 is a perspective detail view of one of the notched rotating elements for releasably retaining the case and loop members in parachute-closing relation.

Fig. 7 is a detail vertical fragmentary section of the device on the line 7—7, Fig. 5, disclosing the position and function of a pin for latching a rotating element in loop-releasing position.

Referring in detail to the drawings:

1 designates a parachute comprising the fabric portion 2, the several cords 3 and the ring 4, provided with a bar 5 from which a parcel 6 may be suspended.

The device comprises two cooperating members, a case member 7 having openings 8 in its side wall 9, and a loop member 10 having arms 11 slidable into and out of the case through the openings 8, the arms having transverse grooves or notches 12 providing hooks 13 for engaging arcuate notched ribs or flanges 14 of toothed disks 15 rotatably supported by pins 16 from the bottom wall 17 of the case, whereby the two members may retain cords 3 bundled in the loop, as illustrated in Fig. 1. A cover member 18 secured to the walls of the case by screws 19 closes the case and the openings 8.

The disks 15 are oppositely rotatable through a gear 20 supported therebetween and keyed to a driving and winding spindle 21 journaled in the case bottom 17 and engaged with the inner end of a spring 22, the outer end of the spring being fixed in the wall of an annular housing 23 forming a flanged extension of a toothed wheel 24 rotatable with respect to the spindle 21 and over the bottom wall 17. The spring is wound on the spindle for tensioning to render it capable of rotating the disks 15, by means of a key 25 journaled in the case bottom 17 and provided with a pinion 26 engaged with teeth 27 on the periphery of the wheel 24. A pawl 28 pivotally mounted on a pintle 29 is urged by a spring 30 into engagement with the teeth of the wheel 24 to restrain the wheel to one-way rotation.

A large gear 31 is also keyed to the spindle 21 and meshes with a pinion 32 on a pintle 33 suitably supported by the case; and an escape wheel 34 is rotatable with the pinion 32, the pinion and wheel being keyed to said pintle 33. The wheel 34 is part of escapement mechanism including an oscillating member 35 pivotally mounted on a pintle 36 screw threadedly engaged with the cover 18, the member 35 having arms 37 provided with pawls or teeth 38 alternately engageable with the teeth of the escape wheel to check the rotation thereof intermittently and regularly, the member 35 having a screw-threaded pendulum shank 39 on which a weight 40 is threaded, the weight comprising a nut held in adjusted position by a lock nut 41.

The flanges 14 have notches 42 adapted to register with the openings 8 upon rotation of the disks 15, to permit release of the arm hooks 13 from the flanges and departure of the arms from the case. Pins 43 slidably mounted in the cover 18 are urged by springs 44 against the upper faces of the flanges 14, and enter sockets 45 provided in the flanges adjacent the notches to latch the disks 15 in position for registry of the notches 42 with the openings 8.

A flat spring 46 fixed by a screw 47 to the side wall 9 of the case has ends 48 bearing against the inner ends of the arms 11 of the loop member to eject or expel the loop member from the case and assure the separation of the two members for releasing the parachute cords from retention therebetween.

A latching pin 49 extends through an aperture 50 of the case cover into an opening 51 of the oscillating member 35, and a line 52 is attached to the pin whereby the pin may be drawn from pendulum-latching position, the line being adapted for automatic withdrawal of the latching pin when the parcel and parachute are dropped, and preferably being shorter than the distance between the functionally-positioned device and the handle 53 of the parcel when the parachute and parcel are in extended or falling position, and attached to the parcel, whereby the line will automatically withdraw the latching pin when the parcel is dropped from a height.

The case and the loop member are preferably mounted on parachute cords during assembly of the parachute fabric, cords and ring; the pendulum weight is adjusted along the shank of the oscillating member to provide for rapid or slow oscillations according to the extent of delay desired for the opening of the parachute and the cover is attached to the case. The pendulum-latching pin may be withdrawn or held in withdrawn position during any step in preparing the device that requires rotation of the flanged disks. The driving mechanism is actuated to effect the engagement of the latching pins in the flanges of the notched disks to cause registry of the disk notches with the openings in the side wall of the case. The remaining cords of the parachute are bundled, the bundle is inserted in the loop, and the arms of the loop member are inserted into the case, bearing against the flat spring to tension it. The disk-latching pins are withdrawn from flange-engaging position, the pendulum-latching pin being also disengaged from the escapement, and the disks are permitted to rotate sufficiently to cause the flanges to enter the grooves of the loop member arms, the flange-latching pins ride on the flanges in position to enter the flange sockets, and the pendulum-latching pin is inserted in the cover and pendulum openings to latch the driving mechanism.

The driving spring housing may be rotated by the winding key to further wind the spring.

When the parachute and bundle are dropped, the parcel falls faster than the parachute, and causes the line to withdraw the pin from the cord-supported device, whereby the driving spring is permitted to unwind and rotate the driving spindle which, in turn, actuates the gear train.

The latching pin is retained with the group, hanging in a position where it can do no damage. When the parachute has fallen the predetermined distance, the rotation of the driving spindle will have caused rotation of the flange disks to position the notches of the flanges in registry with the openings of the case; and coincidentally the sliding pins riding on the faces of the flanges enter the sockets to latch the disks in releasing position, and the flat spring expels the arms of the loop member from the case. The loop member and case are mutually repelled outwardly and away from the cords of the parachute, the cords are permitted to spread apart and, therefore, the fabric is permitted to spread and function to retard the velocity of descent of the parcel.

The two members of the device are retained in association with the parachute by the supporting cords, and slide down these cords to the ring, and are supported thereby so that they neither hinder the normal extension of the cords for promoting proper spreading of the fabric, nor dangle to cause hazard to a carried parcel or other object. Their weight may be substantially equal to obviate differential influence on the diametrically opposite sides of the ring where they rest.

The device is preferably adjusted when the parachute is assembled and packed, or re-packed after use, though the operator may gain access to the device, and readjust the escapement control in accordance with the elevation from which the parcel is to be dropped.

What I claim and desire to secure by Letters Patent is:

1. In a parachute opening timing device, a case, a cord bundle-retaining member having an arm movable into and out of the case, means engaged within the case releasably engaging said member, and resilient means for moving the member from the case upon release of the same by said engaging means.

2. In a parachute opening timing device, a case, a loop member, means for engaging the loop member with the case to retain parachute cords therebetween, and means for releasing the loop member including timing mechanism.

3. In a parachute opening timing device, a case, a loop member having a transversely grooved arm slidable into and out of the case, a rotatable member in the case having an arcuate rib movable in said groove, the rib being notched to receive said arm, and means for rotating said member.

4. In a parachute opening timing device, a case, a cord-receiving loop member having transversely grooved arms slidable into and out of the case, rotatable members in the case having arcuate ribs movable in said grooves, the ribs being notched to receive said arms, and timing mechanism for rotating said members.

5. In a device of the character described for controlling a parachute, cooperating members respectively slidable on selected cords of the parachute, means for connecting the members to hold the parachute cords therebetween, and means for disconnecting the members including a gear train, and spring means for rotating the gears.

6. In a device of the character described, cooperating members, one having a lateral opening and a rotating flanged wheel and the other having an arm slidable through the opening in the first-named member and provided with a transverse groove in which the flange of said wheel is movable, said flange being provided with a notch and adapted for the registry of said notch with said opening to admit said arm to flange-receiving position, and means including a gear train for rotating the rotating member to register the notch with the opening.

7. In a device of the character described, cooperating members one having a movable element provided with a notched flange, and the other having an arm movable into and out of the first-named member and provided with a hook adapted to engage said flange and movable through the notch thereof into engagement therewith, means for moving the movable element to position the notch to receive the hook, and resilient means for moving the releasable member away from the other member.

8. In a device of the character described, cooperating members, a movable element supported by one of the members provided with a notch, the other member having a hook adapted to move through the notch of the movable element into engagement therewith, means moving the movable element to position the notch to receive the hook, and means moving the hook member away from the other member.

9. In a device of the character described, cooperating members, a notched movable element supported by one of the members, the other member having a hook adapted to move through the notch of the movable element into position for engagement with said element, means moving the movable element to position the notch to receive the hook, said means moving the movable element to engage the same with the hook, and means for moving the hook member away from the other member.

10. In a device for timing the opening of a parachute, a case having an ear for engaging a cord of the parachute, a rotatable shaft journaled in the wall of the case, a gear wheel rotatably mounted on the shaft and rotatable over the wall of the case, a spring housing fixed to said gear wheel, a spring having one end fixed to the housing and the other fixed to the shaft, means supported by the housing for rotating the gear wheel to tension the spring, and a cord-engaging loop engageable with the case and releasable by said rotating means.

11. In a device of the character described, a case adapted to be supported by the parachute, a cord-bundle retaining member connected with the parachute including a portion movable toward the case to clamp parachute cords to the case, means for latching said member to retain the parachute cords between said member and the case, and means including timing mechanism for releasing said member to release the cords.

12. In a device of the character described, a supporting member connected with the parachute, means including a member connected with the parachute for retaining a cord bundle in engagement with the supporting member, means for latching the retaining member in cord-retaining position, means tending to move said retaining member away from cord-retaining position, and means including timing mechanism for releasing the cord retaining member.

In testimony whereof I affix my signature.

ANDREW H. REED.